United States Patent [19]

Cox

[11] 4,139,587

[45] Feb. 13, 1979

[54] PROCESS FOR FORMING FLUORSPAR COMPACTS

[75] Inventor: Robert J. Cox, Brownsville, Tex.

[73] Assignee: Pennwalt Corporation, Philadelphia, Pa.

[21] Appl. No.: 858,987

[22] Filed: Dec. 9, 1977

[51] Int. Cl.$^2$ ............................ B01J 2/10; C22B 1/08; C21C 7/00

[52] U.S. Cl. ............................................ 264/123; 75/3; 75/53; 106/119; 427/220

[58] Field of Search ................. 106/119; 75/3, 53, 55; 427/220; 264/109, 117, 123

[56] References Cited

U.S. PATENT DOCUMENTS

| | | | |
|---|---|---|---|
| 377,036 | 1/1888 | Lichtentag | 106/119 |
| 3,374,085 | 3/1968 | Stone | 75/3 |
| 3,814,789 | 6/1974 | Cox | 264/117 |
| 3,871,869 | 3/1975 | Overdirk | 75/3 X |

*Primary Examiner*—Sam Silverberg
*Attorney, Agent, or Firm*—Robert G. Danehower

[57] ABSTRACT

An improved process for preparing compacts of finely divided fluorspar for metallurgical use is provided in which water, hydrated lime and molasses are added in specified ratios to fluorspar in a heated mixing vessel. The water facilitates the formation of a lime-molasses coating on the fluorspar particles and impedes reaction of the lime and molasses. The water also provides evaporative cooling of the mixture, subsequent to the mixing operation, causing the molasses to become much more viscous and, resultingly, the mixture to be much less tacky so that it can be efficiently compacted immediately. Following compaction in a compacting machine the compacts are heated in an oven to force the lime and molasses reaction to completion providing a water insoluble binder for the fluorspar particles.

4 Claims, No Drawings

PROCESS FOR FORMING FLUORSPAR COMPACTS

This invention is directed to processes for compacting finely divided fluorspar particles for use as a flux in steel manufacture and other metallurgical operations. Fluorspar may be briquetted, extruded, molded, pelletized or tableted for this purpose in order to overcome the furnace drafts which sweep fluorspar fines out of the furnace.

Various binding additives, both organic and inorganic have been incorporated with fluorspar to assist in compacting. These various additives have been shown in the following U.S. Pat. No. 2,220,383; 2,220,384; 2,220,385; 2,232,242; 2,459,203; 2,465,955; 2,620,267; 3,027,227, 3,044,140 and 3,814,789.

The purpose of the binder additives is to provide a mixture in which fine fluorspar particles are bonded together by the binder when the mass is compacted. The tacky nature of most binders caused considerable difficulty in clogging of the compacting machine and many compacts are broken because of the tendency of the compacts to adhere to the surfaces of the compacting sections and not discharge freely. Briquetting is the preferred type of compacting for finely divided fluorspar.

I have now discovered a process for compacting finely divided fluorspar which uses lime and molasses as the ingredients which react to form a water insoluble binder for the fluorspar particles thereby giving the fluorspar compact ability to resist atmospheric moisture during storage and to provide sufficient strength to prevent crumbling during shipping, storage and handling prior to use. The increase in density by compacting minimizes loss of florspar particles in the stack gases of the metallurgical furnaces.

Hydrated lime has been used as a binding agent in the making of a fluorspar pellet as disclosed in U.S. Pat. No. 2,184,078. In this process the mixture of fluorspar fines and hydrated lime are solidified by a high temperature sintering process.

In U.S. Pat. No. 2,220,383 the patentee uses a wet mixture of casein, bentonite clay and lime to bind fluorspar fines in the form of pellets. In U.S. Pat. No. 2,620,267 the patentee uses lime and portland cement as a binder for fluorspar fines. In U.S. Pat. No. 3,799,762 molasses is used as a binding agent for making briquettes of calcium fluoride, manganese and iron.

The reaction of lime and molasses has heretofore been used as a binding agent for dried fluorspar particles. A particular advantage of my process is that the fluorspar particles can be taken from the process of preparing fluorspar concentrate and/or fine fluorspar ore fines while still wet with water. The water content can be as high as 12% in my process. This use of wet fluorspar in my process provides a cheaper fluorspar compact since the expense of pre-drying and investment in closed equipment served by dust collectors or other types of ventilation are not required.

Some prior art process for making fluorspar compacts using lime and molasses binding agents have added small amounts of water to facilitate mixing of the viscous molasses with the mixed fluorspar and lime particles but this has never been in an amount equivalent to the water in a fluorspar filter cake which may vary from 4 to 12% by weight. In the prior art processes which have not used water or only a small amount of water for mixing there is not required a heating and cooling cycle which leaves the mixture of lime and molasses uniformly distributed on the surface of the fluorspar particles. Additionally, the absence of the water without the heating and cooling cycles leaves the coated fluorspar particles in a loosely aggregated tacky condition which precludes predensification prior to compacting and causes the compact to vary in resistance to moisture in storage, and fracture and crumble in handling because of non-uniformity in the molasses coating. The source of finely divided fluorspar particles for compacting is fluorspar concentrate, fluorspar ore fines and mixtures thereof. The concentrate may be mixed with other finely divided fluorspar-bearing materials or if the fluorspar concentrate is to be diluted to produce compacts of a specified lower calcium fluoride concentration finely ground limestone or other nonobjectionable inert material is added in required proportions. Calcium fluoride produced as a by-product in processing fluorapatite rock may be combined with the fluorspar. The metallurgical market requires compacts of various calcium fluoride concentrations ranging from 60 to 94%. Fines resulting from mining and classifying fluorspar ore are also used. These fines may be used alone or mixed with fluorspar concentrate.

The finely divided fluorspar ore particles range from all passing 8 mesh to virtually all retained on 325 mesh. Fluorspar concentrate particles usually range from 100 to 325 mesh, but some producers furnish product as fine as 60% passing 250 mesh. Fluorspar ore fines are ground or classified to substantially all passing 8 mesh with 60 to 70% passing 16 mesh. The finer solids provide the best compacts since high surface area per unit of weight is required for satisfactory bindering.

The finely divided fluorspar may be wet with water from a previous processing operation and, in this case, additional water may not be required to facilitate mixing. On the other hand, if dry concentrate or dry ore fines are used, water is added in any convenient manner to aid in the heat distribution and dispersion of the lime and molasses in the fluorspar.

Generally, at least 4% water by weight of the fluorspar particles on a dry basis facilitates mixing. Amounts of water up to 12% are useful. Water in excess of 12% unnecessarily burdens the subsequent drying operation. A moisture content of 5 to 10% is preferred.

The hydrated lime and molasses are added to the wet fluorspar particles in a mixing vessel such as a steam jacketed pug mill or roller mill which have conveyors lifts which mix the materials and move them through the mixing vessel. It is important in my process that the hydrated lime be added to the fluorspar particles before the molasses is added. If the molasses is added prior to the hydrated lime or if they are added together, undesirable lumps of lime and molasses will form.

The hydrated lime is added continuously to the wet fluorspar in an amount varying from about 1.5 to 3% by weight of the fluorspar (dry basis). Both the hydrated lime and wet fluorspar are introduced to the mixing vessel at ambient temperature. Heat is supplied through the jacket of the mixing vessel and the temperature of the mixture is gradually raised.

After the hydrated lime is uniformly dispersed throughout the fluorspar particles the molasses is introduced to the mixture of hydrated lime and fluorspar. Preferably, the molasses is added continuously to the mixing vessel if the mixing operation is continuous or at a rate required for uniform dispersal if batch mixing.

The molasses is heated as necessary to reduce its viscosity so that its rate of addition as a liquid can be easily regulated.

A convenient temperature range for the addition of the molasses is within the range of about 90° to 115° F. Temperatures at which molasses will caramelize, should be avoided. Molasses is added at a rate of about 2.5 to 6% by weight based on the fluorspar rate (dry basis). The molasses can be any type and from an economic standpoint will be of a grade undesirable for sugar making. Since molasses is an aqueous solution the amount of water brought in with the molasses must be considered in arriving at an overall moisture content. I prefer Blackstrap cane molasses containing about 50–55% total sugars and 20–30% water.

The mixture of fluorspar particles, hydrated lime, and molasses is mixed and heated until the lime and molasses are uniformly dispersed throughout the fluorspar particles. The heat input is regulated so that the temperature of the mixture does not exceed about 210° F. Preferably, the temperature of the lime-molasses coated fluorspar particles will be within the range of about 160°–210° F. In this temperature range the mixture will have a consistency like moist sandy loam soil. When the above conditions of uniform dispersion and temperature are obtained, the mixture of lime-molasses coated fluorspar particles is introduced into another unit of process equipment called a cooler-dryer.

The cooler-dryer is a vessel designed to air dry and cool the mixture of moist fluorspar, lime and molasses by intimately contacting the mixture with a stream of cold to cool atmospheric air or chilled air, the wet and dry bulb temperatures of which upon entering the cooler-dryer in counterflow to the mixture, are less than the desired temperature of the mixture to be discharged from the cooler-dryer. In contact with the mixture, the air increases in temperature and becomes unsaturated in water vapor, and the water in the mixture is rapidly cooled by evaporation causing the mixture to be cooled. The mixture is also cooled, to a lesser extent, by transfer of sensible heat to the air. For convenience and practicability, I prefer that the cooler-dryer be an atmospheric rotary dryer.

The use of a rotary cooler-dryer unit using air to cool and dry the molasses and lime coated fluorspar particles is particularly useful but not specifically required. Such equipment is adaptable as a unit operation to simultaneously cool, dry and minimize or completely avoid sticking of the mixture to the interior surface. When using other types of equipment for the cooling and drying operation, such as water cooled surfaces of a mechanical mixer, a thermo-screw conveyor or metal cooling belt conveyor, the particles stick to the surfaces which transfer heat from the particles. Use of a vacuum dryer would considerably increase the cost of drying equipment and the expense of drying.

This cooling and drying of the coated fluorspar particles is continued until the moisture content of the fluorspar mixture is within the range of about 3 to 5% by weight. Generally, at this moisture content the temperature of the mass of coated particles will be within the range of about 40° to 70° F.

The cooling of the lime-molasses coated particles congeals the molasses on the surface of the lime and fluorspar particles and impedes reaction of the lime and molasses. It is best to complete cooling and drying as fast as practicable but a period of 5 to 15 minutes is satisfactory. When the conditions of moisture and temperature set forth above are reached the lime-molasses coated fluorspar is ready for compacting in a compacting machine.

If the temperature and moisture content are not within the range set forth above the feeding device of the compacting machine will plug, the compacts not discharge freely and the compacts will be chipped, cracked and easily broken by normal handling procedures. Broken surfaces permits easy penetration of atmospheric moisture causing further disintegration of the compacts.

If predensification is desired it can conveniently be done by passing the cooled and dried coated fluorspar particles through a tapered feedscrew densifier. Predensification has the advantage of increasing the capacity of the compacting machine.

The size and shape of the fluorspar compact is not important and pellets, cylinders and briquettes are satisfactory. The only requirement of the compact is that they be of a sufficient size to resist removal by the gases in the metallurgical furnace. I have had good success with a Komarek Greaves briquetting machine producing pillow shaped briquettes measuring 1¾ inches by 1¾ inches on flange edges and by 1 inch thick. I have also produced circular pillow shaped briquettes measuring 1 inch in diameter and ½ inch thick.

After compacting the compacts are passed through an oven where the compacts are heated to remove the remaining moisture and to cure or react the lime-molasses mixture to form the water insoluble binder. The drying and curing is conveniently accomplished by heating them with circulating hot air in a conveyor drier.

Moisture is removed from the compacts at temperatures not exceeding about 230° F. in 10 to 15 minutes. When the moisture content approaches zero percent the temperature is allowed to increase for about 20 to 30 minutes but there is no advantage in allowing the temperature to exceed 300° F. Curing takes place by chemical reaction of the lime and molasses on the surface of the fluorspar particles forming a water insoluble binder for the compacts. Conveniently the drying and curing will be accomplished in the same dryer.

The best mode of practicing my invention will be apparent from a consideration of the following examples.

EXAMPLE 1

Fluorspar ore fines, fluorspar filtercake, lime and molasses were separately fed to a jacketed pug mill mixer having three sections. Saturated steam at 80 to 90 P.S.I.G. was introduced into the second and third jacketed sections of the mixer. The two fluorspar raw materials and lime were introduced in the first section of the pug mill while molasses was fed at the start of the second section of the pug mill. The flow rates are set forth in the table below:

| | Raw Material Feed | | | |
| | Fluorspar | | Binder | |
| | Fines | Filtercake | Lime | Molasses |
|---|---|---|---|---|
| Lbs./Min. | 105 | 258 | 6.9 | 15.2 |
| Lbs./Min. (dry Basis) | 101 | 244 | | |
| Moisture, % | 3.5 | 5.5 | | |
| Av. moisture in spar mix | 4.9 | | | |

The fluorspar and lime being fed to the mixer were near atmospheric temperature of about 58° F. The molasses was heated to about 100° F. prior to its introduction to the second stage of the mixer. The mixture of the fluorspar particles with lime and molasses was discharged from the pug mill to the cooler-dryer at a temperature of about 160° F.

As the fluorspar, lime and molasses mixture left the pug mill mixer, it was introduced into a rotary air dryer. Chilled air ranging in temperature from 32° to 50° F. was drawn through the dryer countercurrently to the to the movement of the fluorspar mixture. The lime, molasses coated fluorspar particles had a temperature within the range of about 60° to 64° F. as it left the cooler-dryer and the moisture content was reduced until the moisture content was about 3.5% by weight. The lime, molasses coated fluorspar particles were then discharged into a surge bin which provided the feed for the predensification unit.

The predensifier was a tapered screw and the discharge from the predensifier was into a Komarek Grieves briquetter machine. The hydraulic loading on the briquetter rolls was about 1,400 to 1,500 P.S.I.G. Briquette formation was good and the green briquettes had high crush strength.

The briquettes were finally introduced to a hot air dryer in which all of the moixture was removed and the briquettes were finally cured at 220° F. Oven retention time was approximately 45 minutes. Production was about 11 tons per hour.

EXAMPLE 2

In Example 2 the fluorspar, lime and molasses feed rates were maintained at the same rates as in Example 1. Additionally, two quarts of water per minute were added to the first stage of the mixing vessel bringing the overall moisture content to 5.45% based on the dry weight of the fluorspar. In the second run the pressure of the briquetter rolls was increased to 1,850 P.S.I.G. Curing of the briquettes was accomplished at about 220° F. the same as in example one.

In this run the temperature of the wetted lime, molasses and fluorspar mixture discharging from the pug mill was about 169° F. and the discharge from the cooler-dryer was about 63° F. The moisture content of the material leaving the cooler-dryer was about 3.7%. Thus there was a reduction of 1.75% moisture content across the cooler-dryer.

Production in both Examples 1 and 2 averaged about 11 tons per hour of dried and cured briquettes containing approximately 80% effective calcium fluoride. A randum sampling of the briquettes from the second run showed a density of 2.85 grams per cubic centimeter and an average weight of 80.2 grams per briquette.

I claim:

1. The continuous process for producing fluorspar compacts from fluorspar particles using lime and molasses to form an insoluble binder comprising:

continuously introducing finely divided fluorspar particles to a mixing vessel equipped with means for heating the fluorspar particles; adding water when necessary to wet the fluorspar particles to provide a moisture content within the range of about 4 to 12% by weight of the fluorspar; adding hydrated lime to the wetted fluorspar particles in the amount of about 1.5 to 3% by weight of the fluorspar (dry basis) and allowing the wetted fluorspar and hydrated lime to disperse uniformly to form a fluorspar mixture; adding molasses to the fluorspar mixture in the amount of about 2.5 to 6% by weight of the fluorspar (dry basis); and continuing heating and mechanically mixing the fluorspar mixture to a temperature not exceeding about 210° F. until the lime and molasses form a uniform coating on the fluorspar particles; and discharging the coated fluorspar particles from the mixing vessel; and introducing the coated fluorspar particles into a cooler-dryer and simultaneously cooling and drying the coated fluorspar particles by use of a cool or cold air stream until the moisture content of the coated fluorspar particles is within the range of about 3 to 5% by weight and the temperature is within the range of about 40° to 70° F.; and discharging the cooled and dried coated fluorspar particles from the cooler-dryer; and introducing the cooled and dried coated fluorspar particles to a compacting machine and forming compacts of the coated fluorspar particles; and discharging the compacts of coated fluorspar particles from the compacting machine; and finally introducing the compacts of the coated fluorspar particles to a heating and curing oven and heating the said compacts to a temperature not exceeding about 230° F. until all the free moisture is removed and thereafter continuing heating the coated fluorspar compacts to a temperature not exceeding about 300° F. until the coating of lime and molasses on the fluorspar particles chemically reacts to form an insoluble binder for the fluorspar compacts.

2. The process of claim 1 in which the hydrated lime is added at a rate of about 2.5% by weight and the molasses is added at a rate of about 4.4% by weight of the fluorspar (dry basis).

3. The process of claim 1 in which the lime and molasses coated fluorspar particles are compacted in a briquetting machine.

4. The process of claim 1 in which the cooled and dried coated fluorspar particles after leaving the cooler-dryer are predensified in a tapered screw conveyor prior to introduction to the compacting machine.

* * * * *